United States Patent
Minnicucci et al.

(10) Patent No.: US 9,681,679 B2
(45) Date of Patent: Jun. 20, 2017

(54) SORTING TABLE FOR SEPARATING FRUITS FROM FOREIGN BODIES

(71) Applicant: C.M.A. S.N.C. DI MINNICUCCI TOMMASO GIUSEPPE & C., Mogliano (IT)

(72) Inventors: Andrea Minnicucci, Mogliano (IT); Roberto Ripani, Pollenza (IT)

(73) Assignee: C.M.A. S.N.C. DI MINNICUCCI TOMMASO GIUSEPPE & C., Mogliano (MC) (IT)

(*) Notice: Subject to any disclaimer, the term of this patent is extended or adjusted under 35 U.S.C. 154(b) by 0 days.

(21) Appl. No.: 15/045,839

(22) Filed: Feb. 17, 2016

(65) Prior Publication Data
US 2016/0242457 A1 Aug. 25, 2016

(30) Foreign Application Priority Data
Feb. 19, 2015 (IT) .............................. MC2015A0017

(51) Int. Cl.
| | | |
|---|---|---|
| *B07C 5/12* | (2006.01) | |
| *A23N 15/02* | (2006.01) | |
| *B07B 1/14* | (2006.01) | |
| *B07B 1/15* | (2006.01) | |
| *B07B 1/46* | (2006.01) | |
| *A01D 17/06* | (2006.01) | |

(52) U.S. Cl.
CPC ........... *A23N 15/025* (2013.01); *A01D 17/06* (2013.01); *A23N 15/02* (2013.01); *B07B 1/14* (2013.01); *B07B 1/15* (2013.01); *B07B 1/4636* (2013.01)

(58) Field of Classification Search
CPC .. B07B 1/14; B07B 1/15; B07B 1/155; B07B 1/16; B07B 13/04; B07B 13/16; A23N 15/02; A23N 15/025; A01D 17/06
USPC ................... 209/606, 660, 667, 668, 672
See application file for complete search history.

(56) References Cited

U.S. PATENT DOCUMENTS

| | | | | |
|---|---|---|---|---|
| 3,367,494 A | * | 2/1968 | Peterson ................ | A01C 1/005 209/668 |
| 3,396,843 A | | 8/1968 | Allen | |
| 5,012,688 A | * | 5/1991 | Ellis ...................... | B07B 1/14 74/89.23 |
| 5,060,806 A | * | 10/1991 | Savage ................... | B07B 1/15 209/668 |
| 5,960,964 A | * | 10/1999 | Austin ................... | B07B 1/4636 209/353 |

(Continued)

FOREIGN PATENT DOCUMENTS

| | | |
|---|---|---|
| EP | 0382676 A1 | 8/1990 |
| EP | 2457671 A2 | 5/2012 |

(Continued)

OTHER PUBLICATIONS

Search Report for Priority Application No. IT MC2015A000017.

*Primary Examiner* — Joseph C Rodriguez
*Assistant Examiner* — Kalyanavenkateshware Kumar

(57) ABSTRACT

A sorting table for separating fruits from foreign bodies has at least one set of rollers revolvingly mounted in a frame. Each roller has a shaft with an axis orthogonal to the longitudinal axis of the frame. The sorting table has adjustment means intended to adjust the distance between the axes of rotation of the rollers according to the dimensions of the fruits to be selected.

10 Claims, 10 Drawing Sheets

(56) References Cited

U.S. PATENT DOCUMENTS

| | | | |
|---|---|---|---|
| 6,305,553 B1 * | 10/2001 | Tirschler | B07B 1/14 |
| | | | 209/606 |
| 8,763,815 B2 * | 7/2014 | Pellenc | B07B 1/4636 |
| | | | 209/668 |
| 2009/0057208 A1 | 3/2009 | Pellenc et al. | |
| 2014/0144118 A1 | 5/2014 | Le Neve et al. | |

FOREIGN PATENT DOCUMENTS

| | | |
|---|---|---|
| FR | 1133674 A | 4/1957 |
| WO | 2009016121 A1 | 2/2009 |
| WO | 2009016125 A1 | 2/2009 |

* cited by examiner

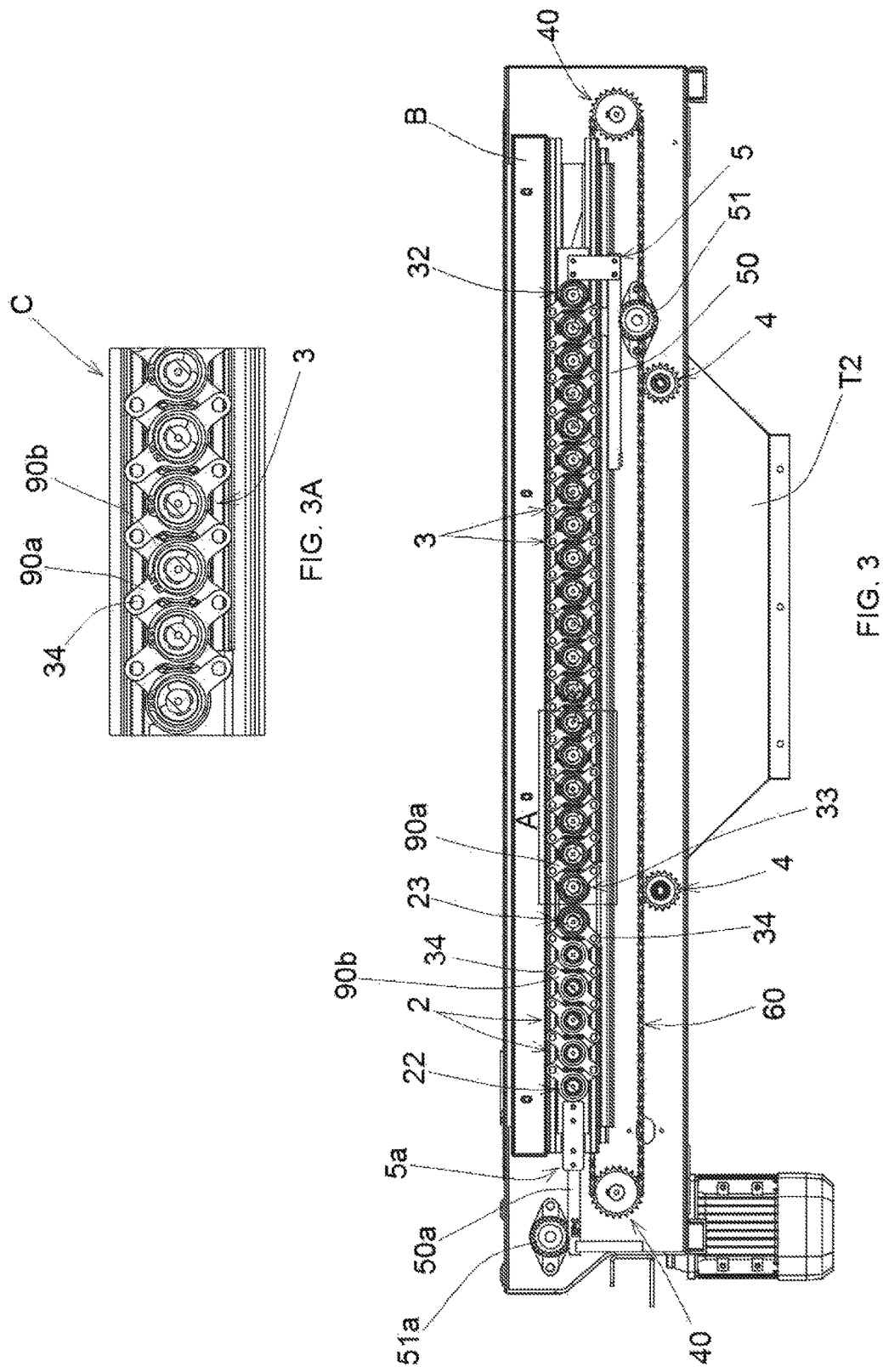

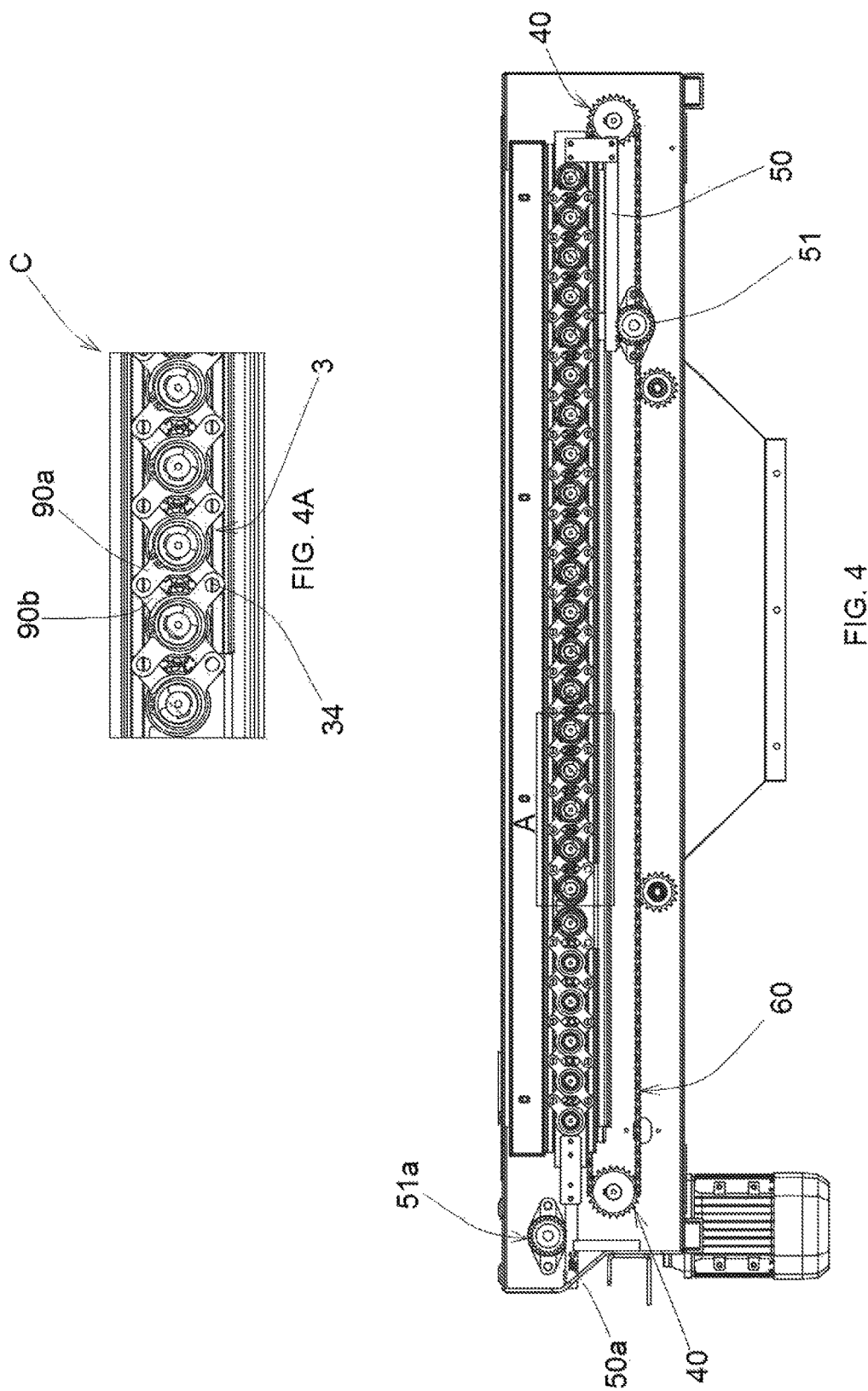

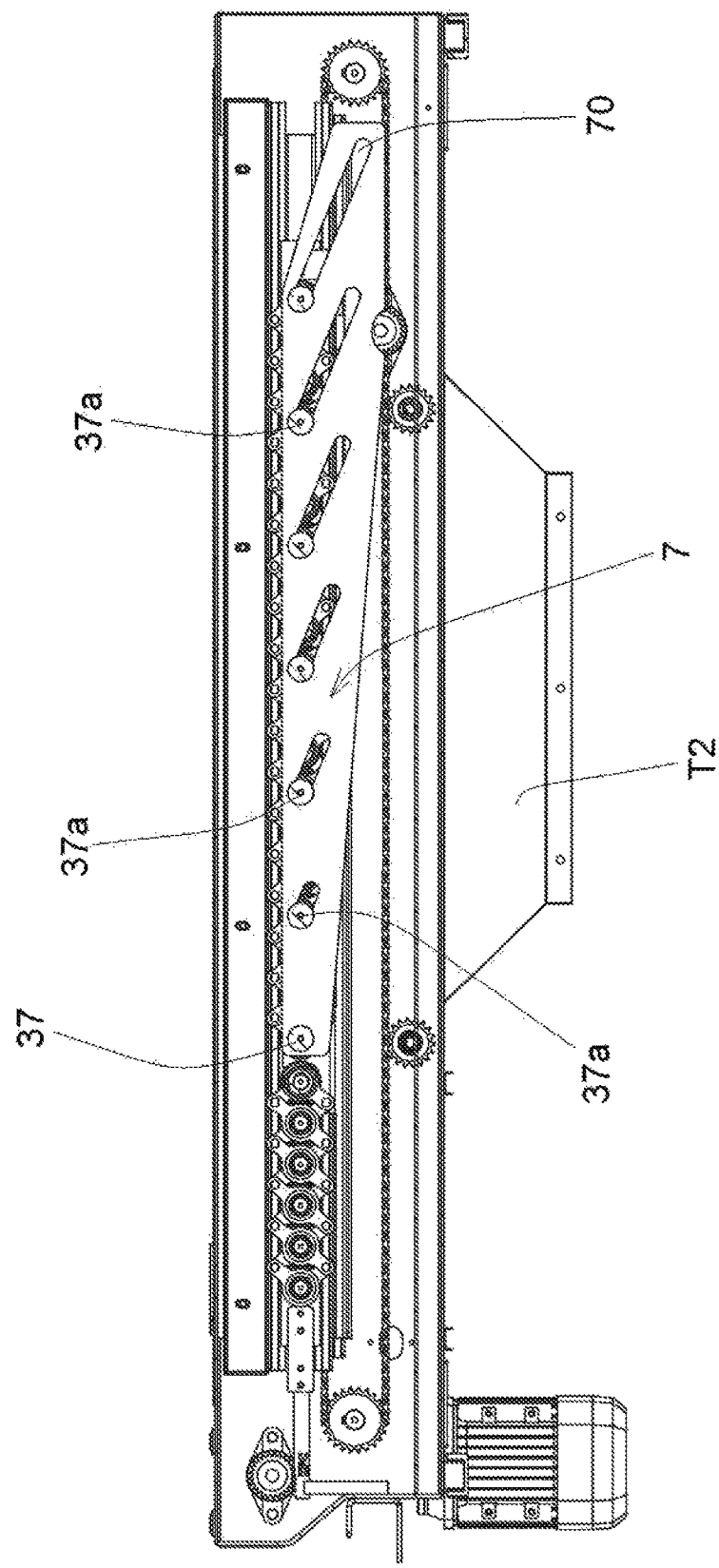

SORTING TABLE FOR SEPARATING FRUITS FROM FOREIGN BODIES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent for industrial invention relates to a sorting table for separating fruits from foreign bodies.

Although the following description refers to a sorting table for separating grape berries from undesired parts, such as stems, leaves, stalks, small dried or unripe grape berries and other foreign bodies, it is understood that the invention can be also used for separating any type of fruits with shape and size similar to grapes, such as for example olives and the like, from foreign bodies.

2. Description of Related Art Including Information Disclosed Under 37 CFR 1.97 and 37 CFR 1.98.

As it is known, the term "destemming" indicates the operation that is carried out to separate the stems from the grapes in bunches, before processing the grapes further. Destemming is normally carried out before pressing by means of special machines, known as destemming machines.

The last generation of destemming machines uses a sorting table comprising revolving rollers with adjustable center distance, for separating grape berries from any undesired part.

Considering that grapes are mechanically harvested a drawback consists in the fact that the harvest consists in grape berries mixed with foreign bodies that need to be eliminated. Therefore, it is absolutely necessary to clean the grapes.

Evidently, the center distance between the revolving rollers must be changed from time to time according to the dimensions of the grape berries to be selected. In view of the above, the sorting tables must be provided with adjustment means in order to bring the revolving rollers closer or farther.

The presence of said adjustment means complicates the fabrication of the sorting table. The more complicated the kinematic mechanism of the adjustment means is, the more expensive and less reliable the sorting table will be.

The adjustment means that have been so far designed and used are impaired by considerable complexity, which makes them difficult to build and subject to mechanical failure, or by impractical use.

EP2457671 discloses a sorting table with rollers of known type.

FR1133674 discloses a calibrating machine for potatoes and the like, comprising a frame that supports a calibrating table made of two consecutive grids comprising rollers that rotate around an axis of rotation in orthogonal direction to the longitudinal axis of the frame. Such a calibrating machine comprises actuation means and transmission means intended to rotate said rollers around their axis of rotation, in such manner to make the potatoes travel forward on said rollers. However, such actuation and transmission means do not ensure a uniform spacing of the rollers.

U.S. Pat. No. 3,396,843 discloses a sorting machine comprising rotational shafts connected by means of an articulated parallelogram kinematic mechanism. Such a sorting machine comprises a linear actuator connected to the articulated parallelogram in such way to make the shafts translate and vary the center distance between the shafts. However the movement of the shafts is generally non-uniform.

The purpose of the present invention is to overcome the drawbacks of the prior art, by disclosing an efficient, inexpensive, safe and versatile sorting table, which can be adjusted from time to time to the dimensions of the grape berries to be cleaned.

In particular, the purpose of the present invention is to provide a sorting table capable of guaranteeing the uniform movement of the rollers.

BRIEF SUMMARY OF THE INVENTION

The sorting table of the invention comprises:
a frame with a longitudinal axis according to the traveling direction of the fruits;
a set of rollers revolvingly mounted in the frame; each roller comprising a shaft with two ends and an axis that is orthogonal to the longitudinal axis of the frame; each roller comprises couplings shaped in such manner to define gaps to let waste or fruits pass; said set of rollers comprise a first roller and a last roller, said rollers being slidingly mounted in longitudinal direction in said frame, except for said last roller;
actuation means and transmission means adapted to drive said rollers into rotation around their axis, in such manner to make the fruit travel forward on said rollers;
adjustment means intended to adjust the distance between the axes of the rollers; said adjustment means comprising a kinematic mechanism that connects said shafts of the rollers, said kinematic mechanism comprising two levers hinged at each end of each shaft, wherein the ends of each lever of a shaft are hinged to the ends of the levers of adjacent shafts; said adjustment means comprising a linear actuator connected to said first roller of said set of rollers to move said first roller in such manner to make said rollers translate with respect to the last roller that is fixed in translation.

Moreover, the sorting table of the invention comprises at least one cam comprising a metal plate hinged in a pin in coaxial position with respect to the last roller of said set of rollers.

The cam has oblique slots with respect to a horizontal axis, which slidingly house pins applied at the ends of the shafts (30) of some of said rollers. Said slots have a decreasing length going from the first roller towards the last roller.

BRIEF DESCRIPTION OF THE SEVERAL VIEWS OF THE DRAWINGS

For purpose of clarity, the description of the sorting table according to the present invention continues with reference to the attached drawings, which are intended for purposes of illustration only, and not in a limiting sense, wherein:

FIG. 3 is an axial side view of the sorting table of the invention, without cam and with the rollers disposed at a minimum distance one from the other;

FIG. 3A is an enlarged view of the detail enclosed in rectangle A of FIG. 3;

FIG. 4 is the same view as FIG. 3, except for the fact that the rollers are disposed at a maximum distance one from the other;

FIG. 4A is an enlarged view of the detail enclosed in rectangle A of FIG. 4;

FIGS. 5, 6 and 7 are axial side views of the sorting table of the invention, showing the various steps of the actuation of the cam during the translation of the separation rollers;

DETAILED DESCRIPTION OF THE INVENTION

Figure 1:
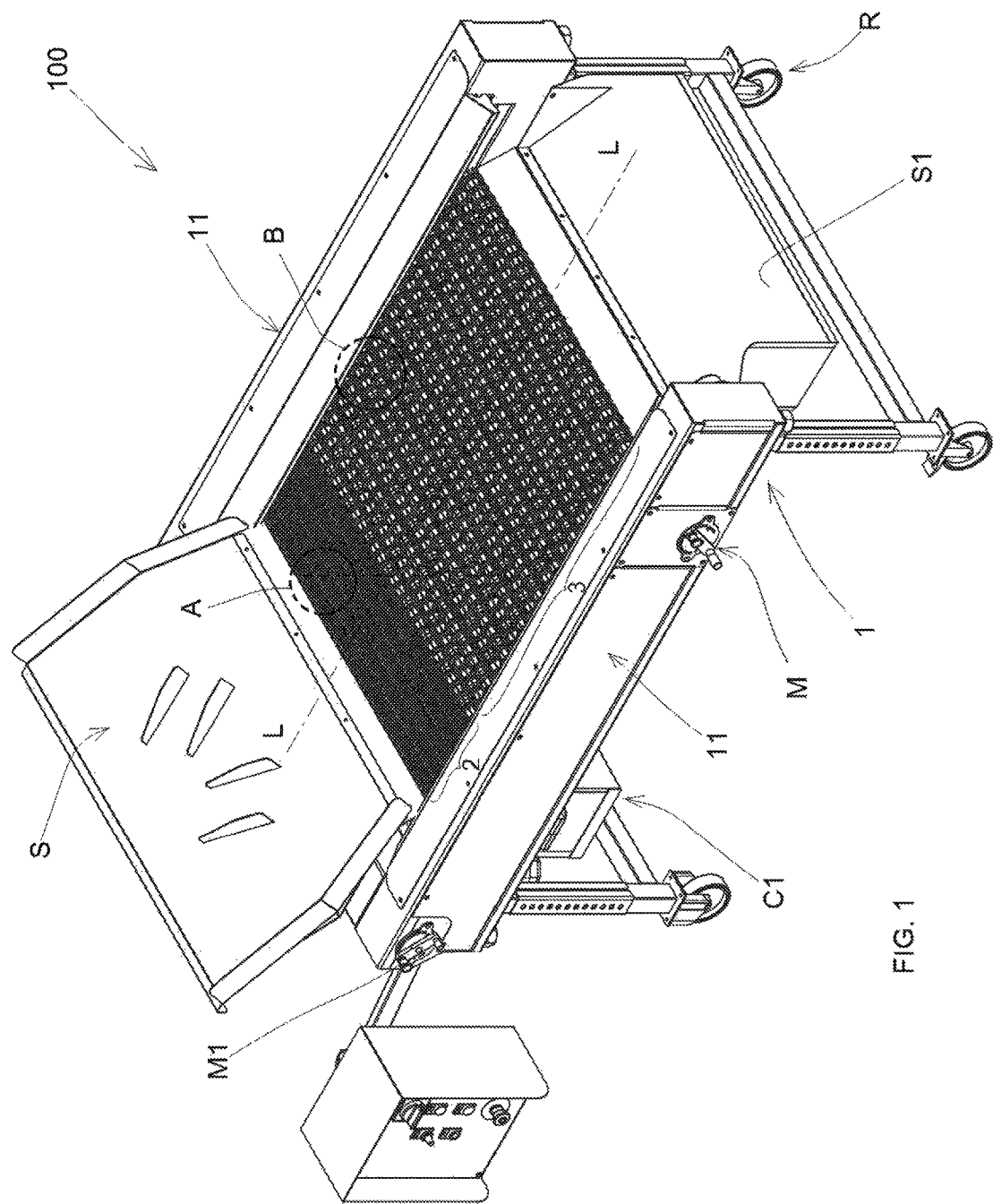
FIG. 1 is an axonometric view of the sorting table of the invention.

Referring to the attached figures, the sorting table of the invention is disclosed, being generally indicated with reference numeral 100. The sorting table (100) is suitable for separating fruits from foreign bodies.

Referring to FIG. 1, the sorting table (100) comprises a frame (1) with rectangular shape and a longitudinal axis (L) coinciding with the traveling direction of the fruits. The frame (1) is preferably supported by telescopic legs, in such manner to be adjusted in height according to the user's requirements. The telescopic legs of the table are supported by four swiveling wheels (R) to facilitate moving the sorting table (100) around.

The sorting table (100) comprises a plurality of calibrating rollers (2, 3) that extend between two lateral walls (11) of the frame (1). The rollers (2, 3) are supported by the frame (1) in order to separate fruits from foreign bodies. The frame (1) supports an inlet slide (S) whereon the fruits to be conveyed towards the rollers (2, 3) are loaded.

The sorting table (100) comprises a set of waste rollers (2) and a set of separation rollers (3) disposed downstream the waste rollers (2) along the traveling direction of the fruits.

The sorting table (100) comprises six waste rollers (2) and nineteen separation rollers (3).

Figure 1B:
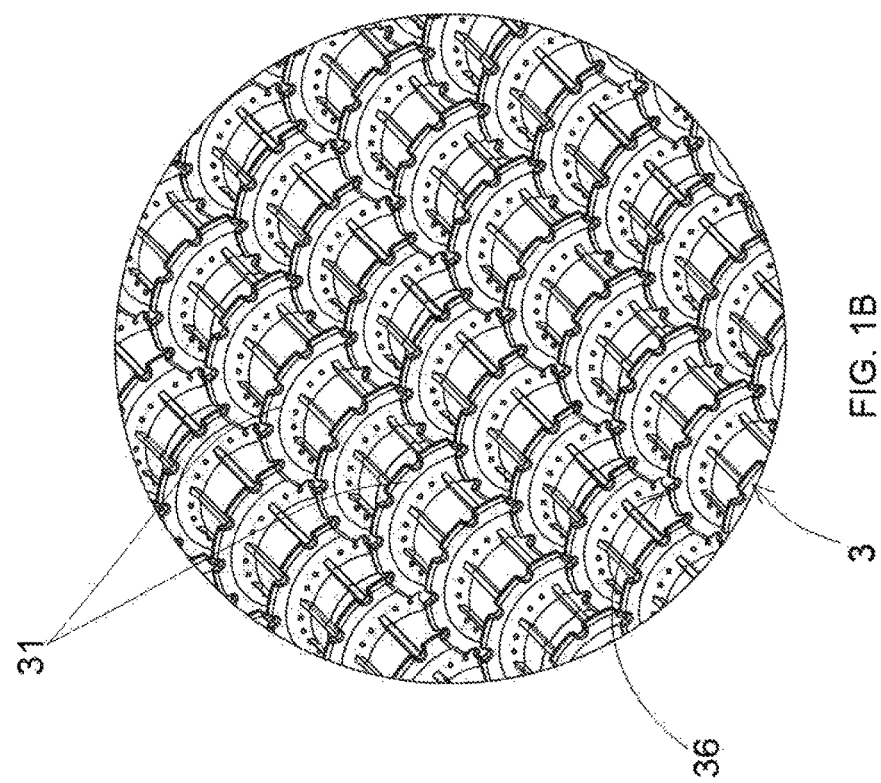
FIG. 1B is an enlarged view of the detail enclosed in circle B of FIG. 1.
Figure 1A:
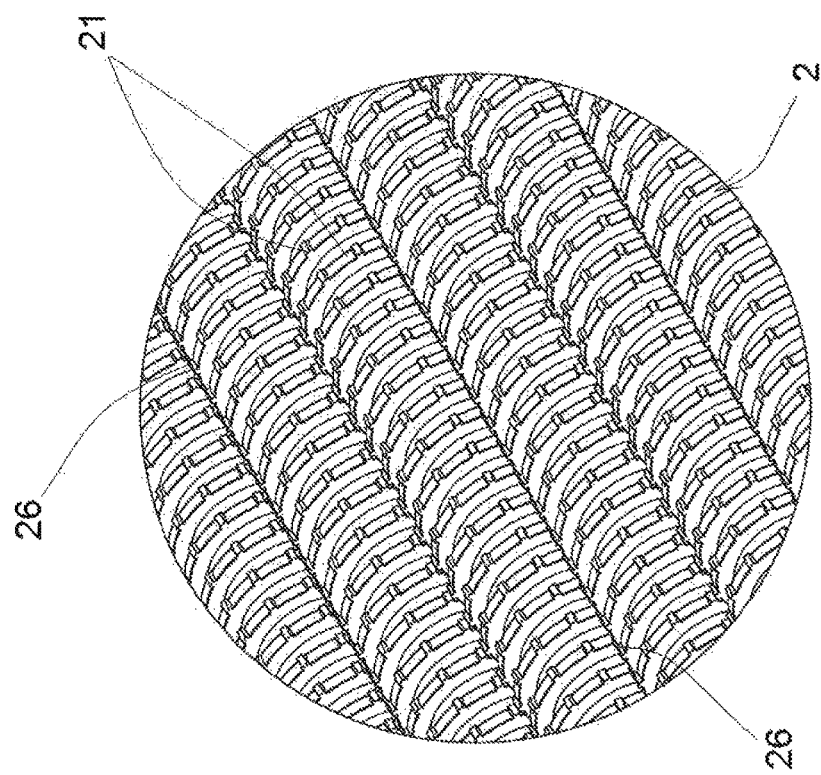
FIG. 1A is an enlarged view of the detail enclosed in circle A of FIG. 1.

As shown in FIG. 1A, the waste rollers (2) are provided with couplings (21) that are suitably shaped in such manner to leave small gaps (26) between two adjacent waste rollers (2). Said gaps (26) are smaller than the intact ripe fruits to be selected. In view of the above, only elements with small dimensions, such as for example dried or broken fruits, small dried grape berries, grape seeds and small vegetable waste, can pass through the gaps (26). Instead, large elements, such as ripe fruits and large foreign bodies, cannot pass through the gaps (26) and continue on traveling towards the separation rollers (3).

As shown in FIG. 1B, the separation rollers (3) comprise couplings (31) that are suitably shaped in such manner to leave gaps (36) that are larger than the intact ripe fruits to be selected between two adjacent separation rollers (3). In this way, the fruits to be selected pass through the gaps (36) and the last waste with large dimensions, such as stalks and stems of the leaves, is transported to the end of the sorting table (100) towards an unloading slide (S1).

Figure 8:
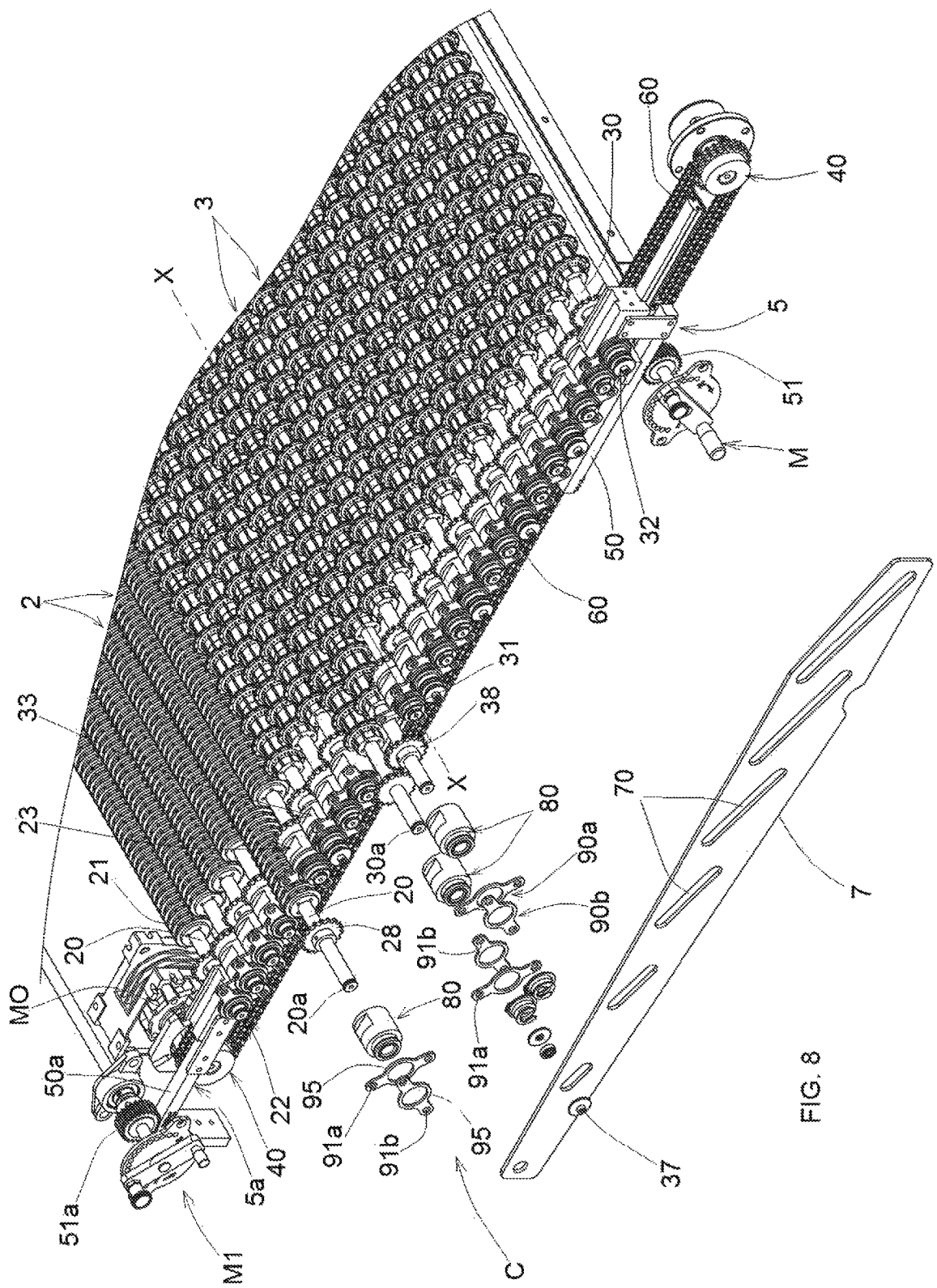
FIG. 8 is a partially exploded axonometric view of a portion of the sorting table of the invention.

Referring to FIG. 8, the rollers (2, 3) are revolvingly mounted in the frame (1) and each roller (2, 3) comprises a shaft (20, 30) with two ends (20*a*, 30*a*). Each roller (2, 3) is free to rotate around its axis (X) that is orthogonal to the longitudinal axis (L) of the frame (1).

The sorting table (100) comprises actuation means intended to drive the rollers (2, 3) into a simultaneous equiverse rotation around their axis (X), in such manner to make the goods unloaded on the rollers (2, 3) travel forward. The sorting table (100) also comprises transmission means intended to transmit the motion from the actuation means to the rollers (2, 3).

Referring to FIGS. 3, 4 and 8, the transmission means of the sorting table (100) comprise a closed-circuit chain (60). The chain (60) is wound around two toothed wheels (40) and is disposed inside one of the lateral walls (11) of the frame. The actuation means comprise an electrical motor (MO) that drives one of the two toothed wheels (40) into rotation. The chain (60) is engaged with gears (28, 38) provided at the ends (20*a*) of the shafts (20) of the waste rollers (2) and at the ends (30*a*) of the shafts (30) of the separation rollers (3). The transmission means of the sorting table (100) also comprise take-up gears (4) intended to guarantee a correct tensioning of the chain (60).

As shown in FIG. 8, the gears (28, 38) have a larger diameter than the shafts (20, 30) of the rollers. Therefore, in order to reduce the center distance of the shafts (20, 30) of adjacent rollers to a value lower than the diameter of each gear (28, 38), the gears (28, 38) are mounted at the ends (20*a*, 30*a*) of the shafts (20, 30) of the rollers (2, 3) in such manner that the adjacent gears (28, 38) are staggered and partially overlapped.

In this case, the chain (60) is a double chain, formed of two identical chains disposed side-by-side in order to engage in staggered gears (28, 38).

Referring to FIGS. 1 and 8, the rollers (2, 3) are disposed in a line, in side-by-side position along the longitudinal axis (L) of the frame (1).

Each set of rollers (2, 3) comprises a first roller (22, 32) and a last roller (23, 33).

The last rollers (23, 33) of the two sets of rollers (2, 3) are fixed in translation, i.e. the last rollers (23, 33) can rotate around their axis (X), but cannot translate longitudinally in the frame. Instead, in addition to rotating around their axis (X), all the other rollers (2, 3) are slidingly mounted in longitudinal direction in the frame (1), in such manner to translate along the longitudinal axis (L) of the frame (1). In this way, the distance between adjacent rollers (2, 3) can be changed.

The waste rollers (2) are disposed in a line, in side-by-side position along the longitudinal axis (L) of the frame (1), from a first waste roller (22), starting from the front end of the table, to a last waste roller (23) along the traveling direction of the products on the sorting table (100).

The last waste roller (23) is fixed in translation, i.e. the last waste roller (23) can rotate around its axis (X), but cannot translate longitudinally along the lateral walls (11) of the frame (1).

The separation rollers (3) are disposed in a line, from a first separation roller (32), starting from the back end of the table, to a last separation roller (33), along the longitudinal axis (L) of the frame, but in opposite direction to the traveling direction of the products on the rollers (2, 3).

The last separation roller (33) is fixed in translation, i.e. it can rotate around its axis (X), but it cannot translate longitudinally along the lateral walls (11) of the frame (1).

The last waste roller (23) and the last separation roller (33) are adjacent.

The sorting table (100) comprises adjustment means suitable for adjusting the distance between the axes (X) of the rollers (2, 3).

Referring to FIGS. 3, 4, 3A and 4A, the adjustment means of the sorting table (100) comprise a kinematic mechanism (C) that connects the separation rollers (3) and the waste rollers (2). Moreover, the adjustment means of the sorting table (100) comprise two linear actuators (5, 5a) respectively connected to the first separation roller (32) and to the first waste roller (22).

The linear actuator (5) is connected to the first separation roller (32) in such manner that the movement of the first separation roller (32) causes the translation of all the other separation rollers (3) with respect to the last separation roller (33), along the longitudinal axis (L) of the frame (1), in the same traveling direction of the products on the rollers (2, 3).

The linear actuator (5a) is connected to the first waste roller (22) in such manner that the movement of the first waste roller (22) causes the translation of all the remaining waste rollers (2) with respect to the last waste roller (23), along the longitudinal axis (L) of the frame (1), in opposite direction to the traveling direction of the products on the rollers (2, 3).

Each linear actuator (5, 5a) is preferably of mechanic type with ratchet-rack. In particular, two racks (50, 50a) are respectively connected to the first separation roller (32) and to the first waste roller (22) and engage with the ratchets (51, 51a).

Although in the attached figures the linear actuators (5, 5a) are of mechanical type with ratchet and rack, said linear actuator (5, 5a) can comprise jacks or may be of connecting rod-crank type, of screw-female screw type or of cam type.

Referring to FIG. 8, the kinematic mechanism (C) comprises two levers (90a, 90b) hinged at each end (20a, 30a) of each shaft (20, 30), with an axis of pin coinciding with the axis (X) of the shaft, in such manner to define two arms with the same length that protrude radially from the ends of the shaft, in diametrally opposite directions. Each lever (90a, 90b) comprises ends with holes (91a, 91b). The two levers (90a, 90b) are disposed at each end (20a, 30a) of the shafts (20, 30) in an X-shaped configuration. The two levers (90a, 90b) of a shaft are connected to the two levers (90a, 90b) of the adjacent shafts by means of pins (34) inserted in the holes (91a, 91b) of the levers. In this way, the ends (20a, 30a) of the shafts (20, 30) are connected by means of a mechanism similar to the mechanism of lazy tongs.

Advantageously, a bushing (80) is mounted at the ends (20a, 30a) of each shaft (20, 30). Each lever (90a, 90b) comprises a central ring (95) revolvingly mounted on the bush (80) and two arms with the same length that protrude radially from the central ring (95) in diametrally opposite directions.

Figure 2:
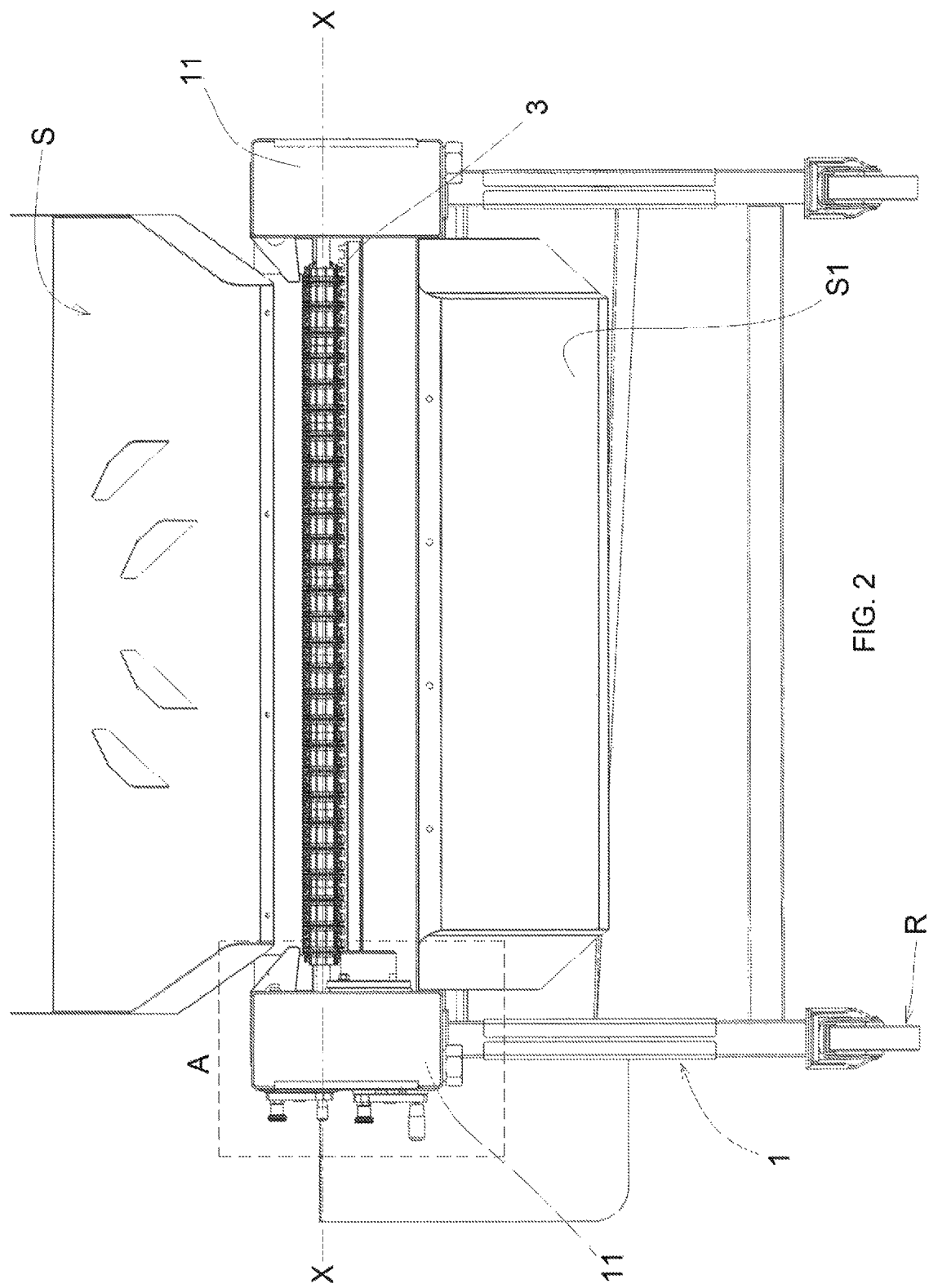
FIG. 2 is a front view of the sorting table of the invention.
Figure 2A:
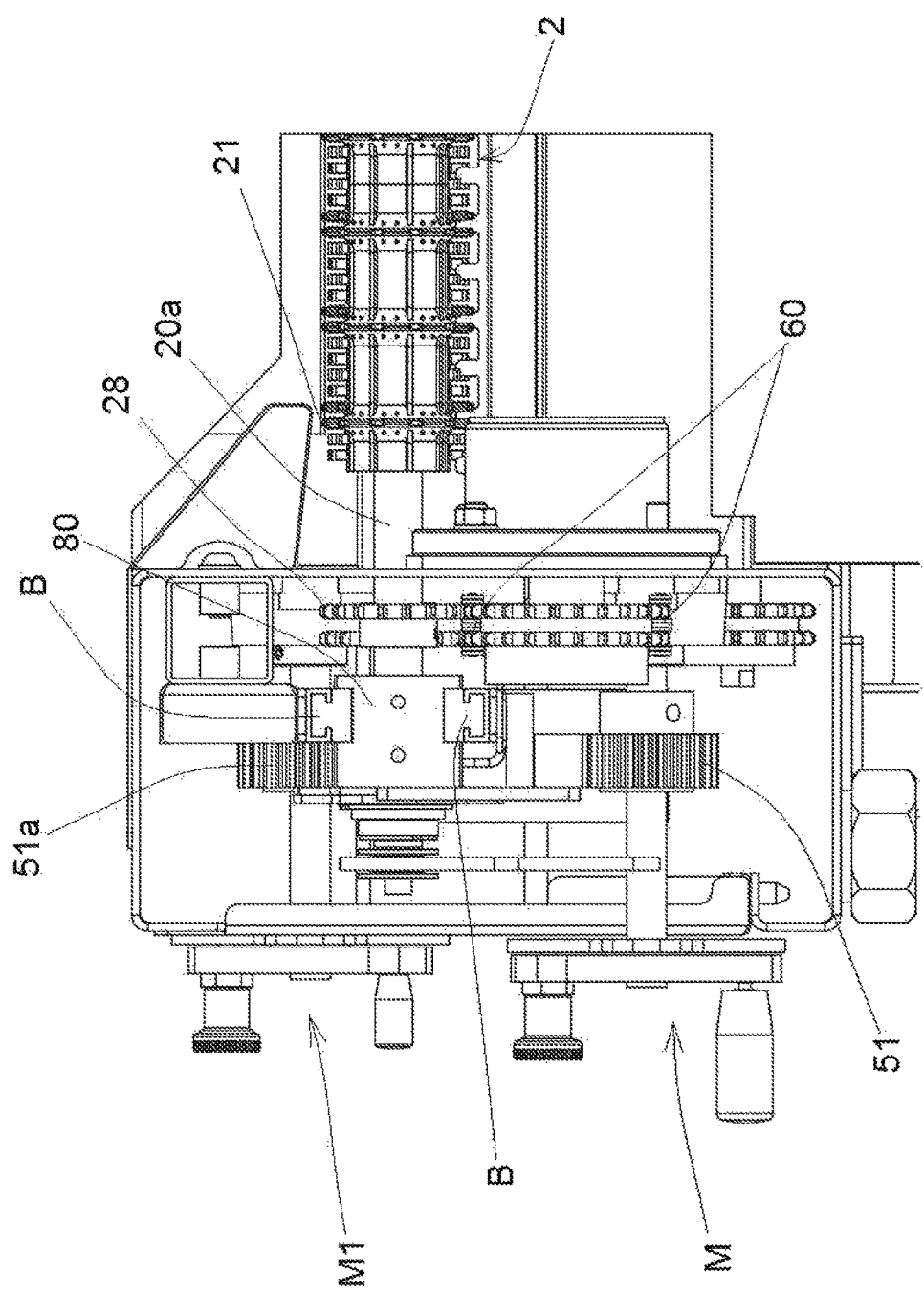
FIG. 2A is an enlarged view of the detail enclosed in circle A of FIG. 2.

With reference to FIG. 2A, each bush (80) is supported and guided by rails (B) that extend longitudinally and are contained inside the lateral walls (11) of the frame.

Referring to FIG. 1, knobs (M, M1) are disposed outside one of the lateral walls (11) of the frame and are connected to the ratchets (51, 51a) of the actuators (5, 5a). In this way, the distance between the axes (X) of the rollers (2, 3) can be easily adjusted by rotating the knobs (M, M1). In fact, a rotation of a first knob (M), joined to the ratchet (51) of the actuator (5), determines a translation of the separation rollers (3) with respect to the last separation roller (33). A rotation of a second knob (M1), joined to the ratchet (51a) of the actuator (5a), determines a translation of the waste rollers (2) with respect to the last waste roller (23).

Therefore, the distance between the axes (X) of the separation rollers (3) can be adjusted independently from the distance between the axes (X) of the waste rollers (2). In this way the distance between the waste rollers (2) and the distance between the separation rollers (3) can be adjusted according to the dimensions of the small waste to be wasted and of the fruits to be selected.

As shown in FIGS. 3 and 4, respectively, the distance between the axes (X) of adjacent separation rollers (3) can have values comprised between a minimum value ($D_{min}$) of approximately 48 mm and a maximum value ($D_{max}$) of approximately 58 mm.

Figure 6:
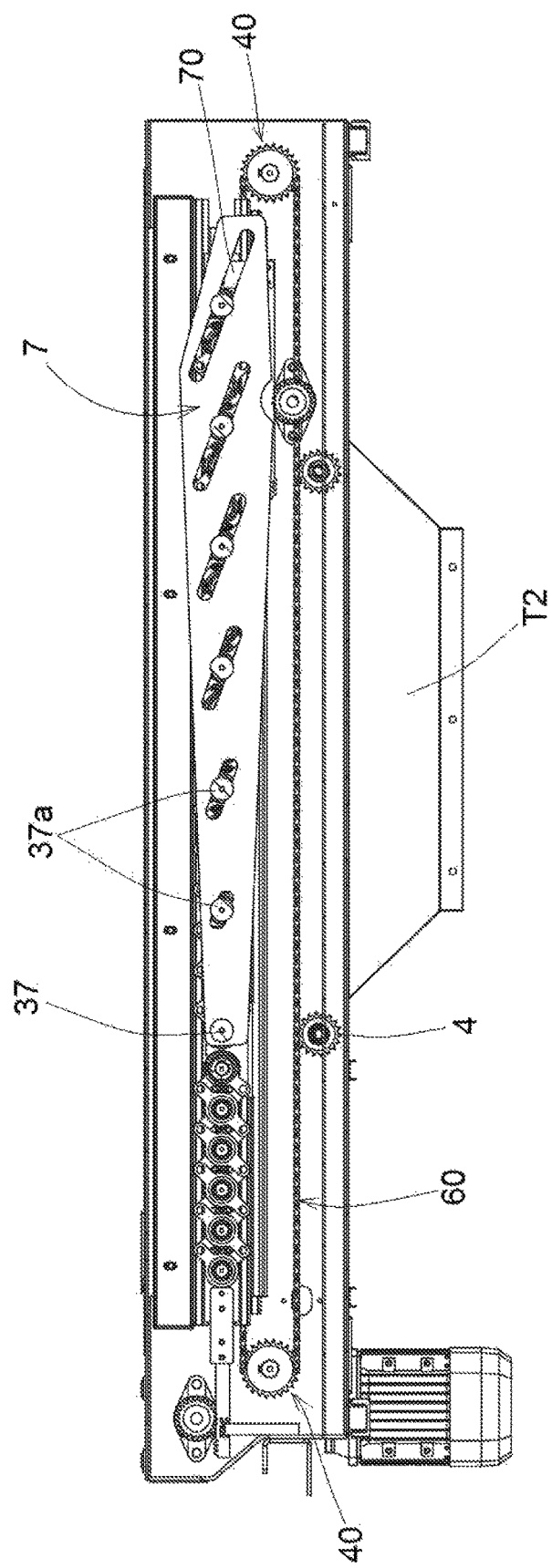
Figure 7:
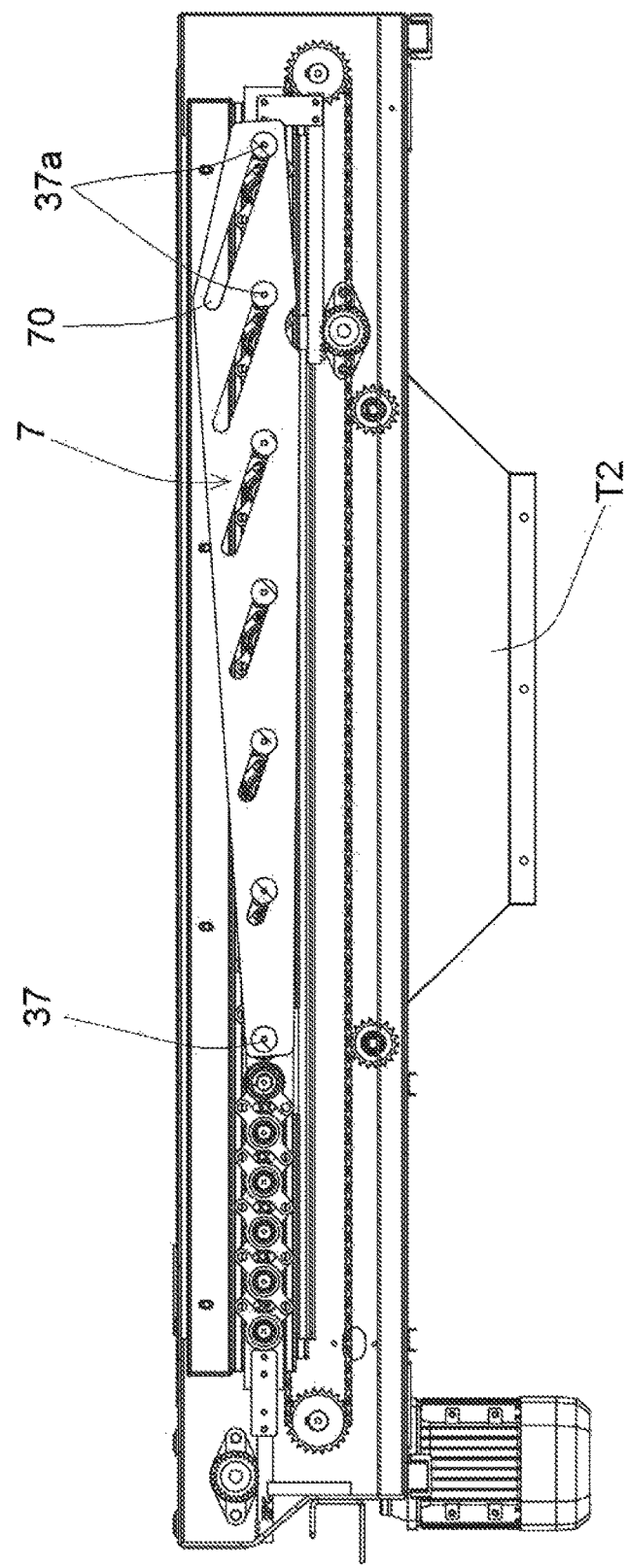

With reference to FIGS. 5 to 7, the sorting table (100) comprises a pair of opposite cams (7) disposed inside the lateral walls (11) of the frame. Each cam (7) is composed of a metal plate, disposed along a vertical plane, hinged in a pin (37) in coaxial position with respect to the last separation roller (33), which is fixed in translation. The cam (7) is provided with a plurality of slots (70) in oblique position with respect to a horizontal axis.

The slots (70) slidingly house pins (37a) applied at the ends (30a) of the shafts (30) of some of the nineteen separation rollers (3).

Considering that the actuator (5) is connected to the first separation roller (32), the translation made by the first separation rollers (3) is larger than the translation made by the last separation rollers. In view of the above, the separation rollers (3) would make non-uniform translations; i.e. the first separation rollers move by a longer distance compared to the last separation rollers.

In order to avoid such a drawback, the slots (70) do not have the same length, but a decreasing length, starting from the first separation roller (32) and going towards the last separation roller (33).

While the ratchet (51) engages in the rack (50), the separation rollers (3) are driven in translation and the pins (37a) slide inside the slots (70), thus raising the cam (7) that rotates around the pin (37). Therefore, the presence of said cam (7) ensures a uniform spacing of all separation rollers (3).

Although the drawings show that the cam (7) has been applied only to the separation rollers (3), a cam similar to the cam (7) can be applied to the waste rollers (2). In this case, the cam of the waste rollers must have slots with decreasing length going from the first waste roller (22) towards the last waste roller (23).

Referring to FIG. 1, the sorting table (100) advantageously comprises an unloading slide (S1) fixed to the frame (1) downstream the first separation roller (32), in order to convey foreign bodies towards suitable containers.

As shown in FIG. 3, the sorting table (100) also comprises a hopper (T2) disposed under the separation rollers (3) in order to convey the selected fruits passing through the gaps (36) between the separation rollers (3) towards the following processing machines.

As shown in FIG. 1, the sorting table (100) also comprises a container (C1) fixed to the frame (1) and disposed under the waste rollers (2). Said container (C1) comprises a compartment in communication with the gaps (26) defined by the couplings (21) of the waste rollers (2) to collect the dried fruits passing through the gaps (26) of the waste rollers.

Although the figures show a sorting table comprising two sets of rollers, i.e. a set of waste rollers (2) and a set of separation rollers (3), the invention is also extended to a sorting table with only one set of rollers that can be either waste rollers or separation rollers, according to the center distance to be set between the rollers.

Evidently, the essential characteristic of the invention is the provision of the cam (7) that allows a uniform translation of the rollers, so that the rollers have the same center distance.

We claim:

1. A sorting table apparatus for separating fruit from foreign objects, the sorting table apparatus comprising:
    a frame having a longitudinal axis extending along a direction of travel of the fruit;
    a set of rollers rotatably mounted on said frame, each roller of said set of rollers comprising a shaft having ends and an axis orthogonal of the longitudinal axis of said frame, each roller having couplings shaped so as to define gaps adapted to allow the fruits or the foreign objects to pass therethrough, said set of rollers having a first roller and a last roller, all of the rollers of said set of rollers other than said last roller being slidingly mounted along the longitudinal axis of said frame;
    an actuator and a transmission connected to said set of rollers so as to rotate the rollers of said set of rollers around the axis thereof so that the fruit travels forward on the rollers;
    an adjustment mechanism adapted to adjust a distance between the axis of the rollers, said adjustment mechanism comprising a kinematic mechanism that connects the shafts of the rollers, said kinematic mechanism having a pair of levers hinged at each end of the shaft, wherein the ends of each lever of said pair of levers are hinged to ends of the levers of an adjacent shaft, said adjustment mechanism comprising a linear actuator connected to said first lever so as to move said first roller such that the rollers translate with respect to said last roller, said last roller being fixed in translation; and
    at least one cam having a metal plate hinged at a pin coaxially to said last roller, said at least one cam having slots in an oblique position with respect to a horizontal axis that slidingly houses pins applied to the ends of the shafts of some of the rollers, said slots having a decreasing length from said first roller towards said last roller.

2. The sorting table apparatus of claim 1, wherein said linear actuator comprises a rack connected to said first roller of said set of rollers, and a ratchet that engages into said rack.

3. The sorting table apparatus of claim 1, wherein said kinematic mechanism comprises a bush mounted at the ends of each shaft, each lever of said pair of levers comprising a central ring revolvingly mounted on said bush and two arms with the an identical length that protrude radially from said central ring in diametrally opposite directions.

4. The sorting table apparatus of claim 1, wherein said transmission comprises a closed-loop chain and two toothed wheels around which said chain is wound, said chain engaging with gears provided at the ends of the shafts of the rollers.

5. The sorting table apparatus of claim 4, wherein said gears are mounted at the ends of the shafts of the rollers in such manner that adjacent gears are staggered and partially overlapped.

6. The sorting table apparatus of claim 4, wherein said actuator comprise an electrical motor that drives one of said two toothed wheels into rotation.

7. The sorting table apparatus of claim 1, further comprising:
    a hopper fixed to said frame and disposed under said set of rollers in order to convey selected fruits passing through the gaps towards following processing machines.

8. The sorting table apparatus of claim 1, wherein said set of rollers comprises separation rollers, wherein a center distance between the separation rollers is set in such manner that the gaps have larger dimensions than the dimensions of the fruits to be selected.

9. The sorting table apparatus of claim 8, further comprising:
    a set of waste rollers disposed upstream of the separation rollers, wherein a center distance between the waste rollers is set in such manner that the gaps between adjacent waste roller have dimensions that are less than the dimensions of the fruits to be selected in such manner to let the waste with dimensions less than the dimensions of the fruits to be selected pass.

10. The sorting table apparatus of claim 9, further comprising:
    a container fixed to the frame and disposed under the waste rollers, said container comprising a compartment in communication with the gaps of the waste rollers, said compartment adapted to collect the waste passing through said gaps.

* * * * *